3,291,730
MEMBRANES FOR CONCENTRATION
OF SOLUTIONS
Fred E. Martin, Azusa, Calif., assignor to Aerojet-General Corporation, Azusa, Calif., a corporation of Ohio
No Drawing. Filed Sept. 9, 1963, Ser. No. 307,336
2 Claims. (Cl. 210—22)

This invention deals with the use of membranes for the concentration of solutions. More particularly, this invention deals with removal of detergents from water by the reverse osmosis technique.

The removal of water from aqueous solutions and the concurrent concentration of the solute is a common practice. It is usually attained by distillation techniques. More recently, the removal of organic contaminants such as, non-biodegradable detergents in waste water has become a serious problem. The presence of large amounts of non-biodegradable detergents in waste water due to the increasing use of synthetic detergents has made conventional techniques for water purification inoperable. Distillation of waste water containing detergents, causes considerable foaming which makes the process highly undesirable.

Detergents which cause problems include for the most part the alkylbenzene sulfonate based detergents commonly used. Additionally however, other types of detergents such as the alkylphenol nonionics, alkanolamines and alkanolamides are non-biodegradable and cannot be removed by conventional water purification techniques.

It is an object of this invention to provide a technique for the removal of water from aqueous solutions. It is a further object of this invention to provide a technique for the removal of water from aqueous solutions which makes unnecessary the application of heat and in which the efficiency of the process may approach 100% of theory.

These and other objects are accomplished by concentrating an aqueous solution with the use of a membrane and reverse osmosis technique.

More particularly the aqueous solution is circulated over a cellulose acetate membrane mounted in a pressure cell.

The membrane is prepared by casting a solution of: cellulose acetate, water, a solvent for cellulose acetate and a swelling agent for cellulose acetate.

Any solvent for cellulose acetate such as acetone or dioxan is useful in casting the cellulose acetate membrane. Generally, sufficient solvent is employed to reduce the viscosity of the casting solution to be easily handled. Preferably from about 270 to about 330 parts of solvent are employed per 100 parts of cellulose acetate.

Any material which is a swelling agent for cellulose acetate such as magnesium perchlorate or zinc bromide can be used in preparing the casting solution. Generally, about 2.5 to about 15 grams of swelling agent are employed per 100 parts of cellulose acetate.

Water, ranging from about 30 to about 120 parts per 100 parts of cellulose acetate is employed in the casting solution. Best results are obtained when about 45 to about 90 parts of water are employed for each 100 parts of cellulose acetate.

The cellulose acetate membranes are prepared by casting a film of the above solution on glass at a temperature below about 0° C. Preferably, the casting temperature is about −12° C. to about 0° C. The film may be cast at a thickness of about 2½ mils to about 20 mils. After the film is cast, it is allowed to dry for a time sufficient to allow any streaks created by the knife blade in casting the film to smooth out. Generally, this time is from about 3 minutes to about 8 minutes. This drying time is not essential to the creation of a useful membrane. However, it is desirable in order to allow any streaks created by the knife blade in casting the film to smooth out.

The film cast on the glass is allowed to set in cool water, preferably ice water, for time sufficient to allow the membrane to soak loose from the glass plate. In general, this time ranges from about 10 to about 20 minutes.

The membrane is then heated at a temperature of about 80° C. to about 90° C., preferably about 84° C., in order to fix the membrane and obtain a desirable semi-permeability. The membrane is heated for a time ranging from about 5 minutes to about 1 hour or longer. The time for which the membrane is heated has little effect on the resulting flux and semi-permeability of the membrane. The temperature at which the membrane is heated, however, has a significant effect on the semi-permeability and flux of the membrane. A higher temperature will cut down the flux, the amount of material passing through the membrane, but will increase the amount of waste material removed, that is, the purity of the water recovered.

The membrane is then mounted in a pressure cell with the air-dried surface of the membrane in contact with the solution to be treated. The pressure under which the solution is placed in order to obtain separation of pure water is at least the osmotic pressure of the solution. The osmotic pressure of a waste water containing 1000 p.p.m. total solids as inorganic salts (a high level of inorganic salt) and 100 p.p.m. of a non-biodegradable detergent (a very high level of detergent) would be less than about 20 pounds per square inch. Generally, however, a higher pressure is desirable in order to obtain a better removal and higher flow of liquid through the membrane. Thus, the pressure applied is generally above about 1500 p.s.i. and may be as high as 3000 p.s.i. The linear flow of the solution over the membrane is not critical but generally a linear velocity of at least one foot per second is employed.

The following example is given in illustration and is not intended to limit the scope of the above defined invention. In the example and throughout this specification, parts and percentages are by weight unless otherwise indicated.

A casting solution was prepared by mixing 100 g. of cellulose acetate (Eastman Chemical Products, Incorporated No. E-398-3), 300 g. of acetone, 60 g. of water, and 5 g. of magnesium perchlorate. A film was cast ten mils thick on glass at −12° C., allowed to dry three minutes, then set in ice water. The membrane was allowed to soak loose from the glass plate, then heated to 84° C. for one hour in water, cooled, and stored in deionized water.

The membrane was mounted in a pressure cell with the air-dried surface of the membrane in contact with a solution which contained 115 p.p.m. dodecylbenzene sodium sulfonate. This solution was circulated over the membrane at a linear velocity of one foot per second and at a pressure of 1500 p.s.i. A product was collected at a product rate of 30.2 gals. per sq. ft. of membrane per day and contained three p.p.m. dodecylbenzene sodium sulfonate.

Highly effective removal of synthetic detergent was obtained using the technique of reverse osmosis. In the example shown above, the solution contained 115 parts per million of dodecylbenzene sodium sulfonate. In practice, however, only about 5 to 10 p.p.m. synthetic detergent are present in common waste water.

Having fully described the process and its utilities, it is desired that the invention be limited only withn the lawful scope of the appended claims.

I claim:
1. The process of removing water from aqueous solutions containing synthetic detergents selected from the group consisting of alkylbenzene sulfonates, alkylphenol nonionics, alkanol amines and alkanol amides which comprises passing the aqueous solution over one side of a cellulose acetate membrane at a pressure above the osmotic pressure of the aqueous solution and recovering a product water of reduced synthetic detergent content from the other side of the cellulose acetate membrane, said product water having a synthetic detergent content not in excess of about three parts per million.
2. The process of claim 1 wherein the pressure is above about 1500 p.s.i.

References Cited by the Examiner
UNITED STATES PATENTS
3,170,867  2/1965  Loeb et al. _____ 210—22

OTHER REFERENCES

McBain et al.; Chemical Society Journal, vol. 121, 1922, Part 2, pp. 2325–2335 relied upon.

Schwartz et al.; Surface Active Agents, 1949, Interscience Publ. Inc., New York, page 289 relied upon.

MORRIS O. WOLK, *Primary Examiner.*

E. G. WHITBY, *Assistant Examiner.*